US009311362B1

(12) United States Patent
Trew et al.

(10) Patent No.: US 9,311,362 B1
(45) Date of Patent: Apr. 12, 2016

(54) PERSONAL KNOWLEDGE PANEL INTERFACE

(71) Applicant: GOOGLE INC., Mountain View, CA (US)

(72) Inventors: Brandon Kyle Trew, San Francisco, CA (US); Andrew Swerdlow, San Francisco, CA (US); Si-Wai Lai, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 631 days.

(21) Appl. No.: 13/842,311

(22) Filed: Mar. 15, 2013

(51) Int. Cl.
*G06F 17/30* (2006.01)

(52) U.S. Cl.
CPC ...... *G06F 17/3053* (2013.01); *G06F 17/30554* (2013.01); *G06F 17/30864* (2013.01); *G06F 17/30867* (2013.01)

(58) Field of Classification Search
CPC .................. G06F 17/30554; G06F 17/30864; G06F 17/30867
USPC ......................................................... 707/723
See application file for complete search history.

(56) References Cited

U.S. PATENT DOCUMENTS

| | | | | |
|---|---|---|---|---|
| 6,594,654 | B1 * | 7/2003 | Salam ............... | G06F 17/30861 |
| 6,633,742 | B1 * | 10/2003 | Turner .................... | G09B 5/00 434/350 |
| 7,318,057 | B2 * | 1/2008 | Aridor .............. | G06F 17/30864 |
| 7,693,827 | B2 * | 4/2010 | Zamir ............... | G06F 17/30867 707/999.003 |
| 7,827,052 | B2 | 11/2010 | Scott et al. | |
| 8,359,319 | B2 * | 1/2013 | Pendse .............. | G06F 17/30867 707/748 |
| 2005/0071328 | A1 * | 3/2005 | Lawrence ........... | G06F 17/3053 |
| 2005/0076003 | A1 * | 4/2005 | DuBose ................. | G06Q 30/02 |
| 2005/0240580 | A1 * | 10/2005 | Zamir ............... | G06F 17/30867 |
| 2006/0271524 | A1 * | 11/2006 | Tanne .............. | G06F 17/30864 |
| 2009/0063475 | A1 * | 3/2009 | Pendse .............. | G06F 17/30867 |
| 2011/0040753 | A1 * | 2/2011 | Knight .............. | G06F 17/30867 707/733 |
| 2012/0005186 | A1 * | 1/2012 | Monteverde ...... | G06F 17/30867 707/707 |
| 2013/0049948 | A1 | 2/2013 | Ali | |
| 2014/0258013 | A1 * | 9/2014 | Collins .............. | G06Q 30/0625 705/26.3 |
| 2014/0258014 | A1 * | 9/2014 | Collins .............. | G06Q 30/0241 705/26.3 |
| 2014/0258276 | A1 * | 9/2014 | Fredinburg ......... | G06F 17/3053 707/723 |
| 2015/0169701 | A1 * | 6/2015 | Stekkelpak ....... | G06F 17/30554 707/723 |
| 2015/0254214 | A1 * | 9/2015 | Rosenberg ............... | G09B 5/06 715/202 |

FOREIGN PATENT DOCUMENTS

| | | |
|---|---|---|
| WO | WO2007/131213 | 11/2007 |
| WO | WO2012167115 | 12/2012 |
| WO | WO2012168107 | 12/2012 |

* cited by examiner

*Primary Examiner* — Jean M Corrielus
(74) *Attorney, Agent, or Firm* — Fish & Richardson P.C.

(57) ABSTRACT

Methods, systems, and apparatus, including computer programs encoded on computer storage media, for providing personal knowledge panels. One of the methods includes receiving, at an Internet search system, a search query. Multiple search results identifying Internet resources indexed by the search system that satisfy the query are obtained. If the search query matches a name of a user that submitted the search query, a ranking of one or more of the search results and a personal knowledge panel comprising one or more items of user provided information about the user is provided, wherein the personal knowledge panel includes multiple input fields for updating the user provided information of the knowledge panel. Updated user information that was provided using the input fields of the personal knowledge panel is received, and the updated user information is associated with an account of the user.

20 Claims, 3 Drawing Sheets

PERSONAL KNOWLEDGE PANEL INTERFACE

BACKGROUND

This specification relates to Internet search engines, and more particularly to ranking search results that are identified as being responsive to search queries.

Internet search engines aim to identify resources, e.g., web pages, images, text documents, multimedia content (e.g., videos), that are relevant to a user's information needs and to present information about the resources in a manner that is most useful to the user. Internet search engines generally return a set of search results, each identifying a respective resource, in response to a user submitted query.

SUMMARY

This specification describes how a system can provide a personal knowledge panel that a user can use as an interface for updating user-provided information about the user maintained by the system. In general, the system allows the user to update information directly in the knowledge panel interface without the need to visit another web page, e.g., without the need to separately visit an account page of the system.

In general, one innovative aspect of the subject matter described in this specification can be embodied in methods that include the actions of receiving, at an Internet search system, a search query; receiving multiple search results, each of the search results identifying an Internet resource indexed by the search system that satisfies the query; determining that the search query matches a name of a user that submitted the search query; providing, in response to the search query, a ranking of one or more of the search results and a personal knowledge panel comprising one or more items of user-provided information about the user, wherein the personal knowledge panel includes multiple input fields for updating the user-provided information of the knowledge panel; receiving updated user information that was provided using the input fields of the personal knowledge panel; and associating the updated user information with an account of the user. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The personal knowledge panel allows the user to modify the one or more items of user-provided information without the navigating away from a search results page that includes a presentation of the one or more search results. The ranking of the one or more search results is based on information provided in the personal knowledge panel. The actions include reranking the search results based on the updated user information; and providing a different ranking of one or more search results based on the updated user information. The actions include providing a different ranking of one or more search results based on the updated user information without further input from the user. The actions include receiving, at the Internet search system, a second occurrence of the search query from a second user; receiving multiple second search results, each of the second search results identifying an Internet resource indexed by the search system that satisfies the query; determining that the search query matches a name of the user and that the user is a contact of the second user; and providing to the second user, in response to the search query, a second ranking of the one or more second search results and a second personal knowledge panel comprising one or more items of the updated user information provided by the user. The second ranking of the one or more second search results is based on the updated user information provided in the second personal knowledge panel. Visibility of one or more items of user information in the second personal knowledge panel is based on visibility settings provided by the user. Receiving updated user information that was provided using the input fields of the personal knowledge panel comprises receiving an indication of visibility that is specific to an item of the updated user information. The actions include providing the received updated user information to one or more other services that each are linked with the account of the user.

Particular embodiments of the subject matter described in this specification can be implemented so as to realize one or more of the following advantages. A user can directly update his or her user-provided information from a search results page without having to visit another page to do so. The personal knowledge panel shows a user exactly what others might see when searching for the user, and allows a user to efficiently and rapidly tailor the information in the personal knowledge panel to control what others see. The accuracy and relevance of search results can be improved by using information provided in the personal knowledge panel to obtain search results. Using information in the personal knowledge panel can also disambiguate search results for entities having the same or similar names.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A search system can provide one or more knowledge panels in response to a received search query. A knowledge panel is a user interface element that provides a collection of information or other content related to a particular entity referenced by the search query. For example, the entity may be a person, place, country, landmark, animal, historical event, organization, business, sports team, sporting event, movie, song, album, game, work of art, or any other entity. In some implementations, the entity may be a concept, subject, or topic.

In general, a knowledge panel provides a summary of information about the entity. For example, a knowledge panel for a famous singer may include the name of the singer, an image of the singer, a description of the singer, one or more facts about the singer, content that identifies songs and albums recorded by the singer, and/or links to searches related to the singer. Other types of information and content can also be presented in the knowledge panel. A knowledge panel for a famous or well-known person typically includes content obtained from multiple disparate sources, e.g., multiple different web pages accessible over the Internet.

A search system may also provide personal knowledge panels about private persons generally, e.g. users who are registered with the search system, who may or may not be well-known. A personal knowledge panel for a private person will generally include data provided by the user rather than data derived from other sources. For example, a personal knowledge panel for a private person can provide a user-provided introduction, profile picture, occupation, education information, contact information, in addition to other types of user-provided information.

The search system may provide a personal knowledge panel for a user of the search system when the user searches for himself or herself, in other words, when the user is logged in and the search query matches the logged-in user's name. The search system may also provide a personal knowledge panel of a user of the search system when a the user searches for one of his or her contacts.

The search system may maintain or have access to a variety of different contacts of the user. For example, a user can be connected with chat contacts, email contacts, or social contacts from one or more social networking services. In some implementations, the search system also hosts a social networking service and presents a personal knowledge panel of the user when a social contact of the user in the search system's social networking service searches for the user, e.g., by entering the user's name as a search query.

Figure 1:
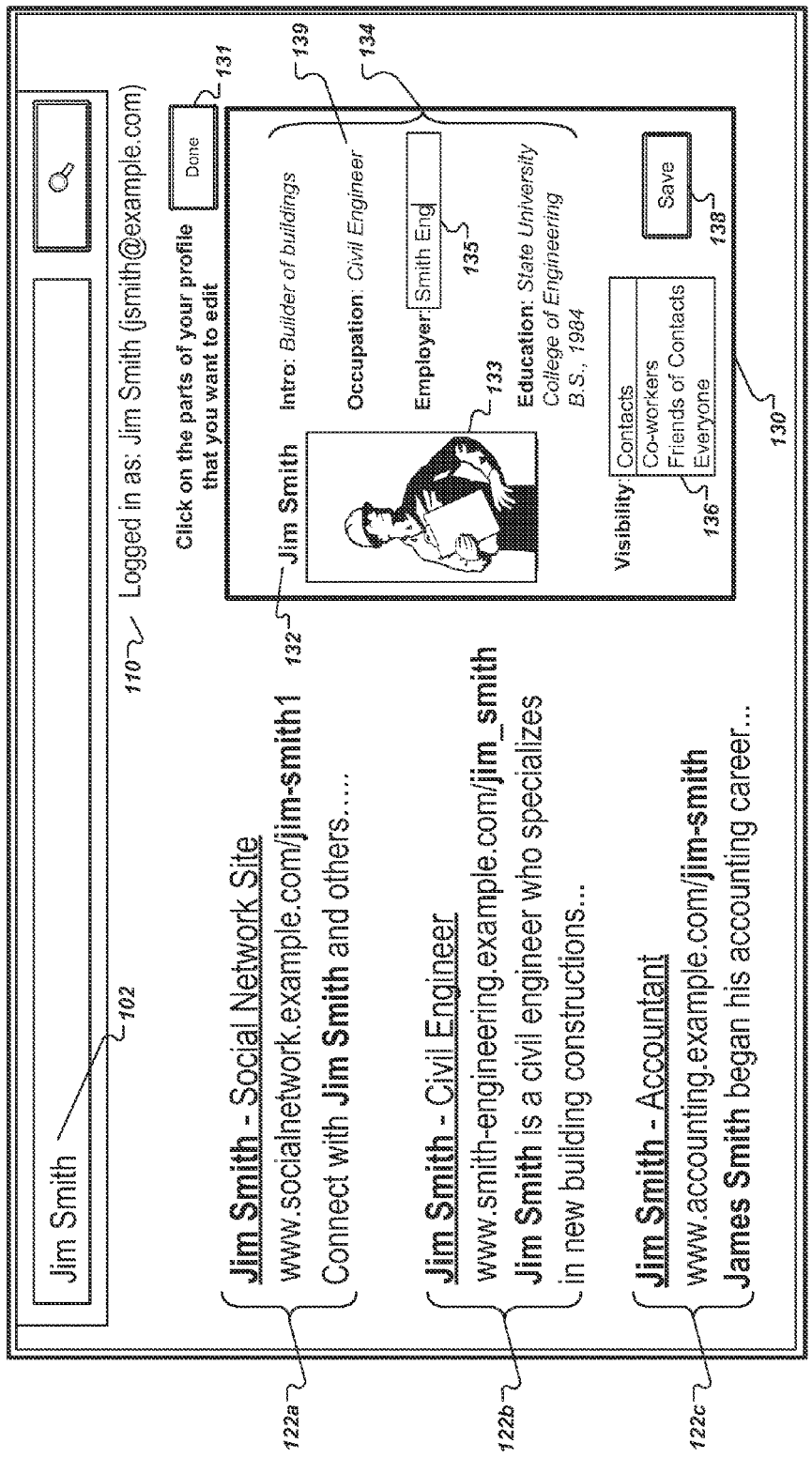
FIG. 1 illustrates an example search results page that includes a personal knowledge panel.

FIG. 1 illustrates an example search results page 100 that includes a personal knowledge panel. A user can submit the query 102 to a search system through a graphical user interface of a software application, e.g., a web browser, or through a user interface of some other software application installed on a user device, e.g., a spoken query issued through a speech recognition application installed on a mobile user device. In response to receiving the query 102, the search system can provide a search results page 100 to the user device in a form that can be presented on the user device. For example, the search results page 100 can be provided as a markup language document, e.g., a HyperText Markup Language document, and the user device can render the document, e.g., using a web browser, in order to present the search results page 100 on a display of the user device.

The illustrated search results page 100 includes three search results 122a-c that the search system has obtained in response to the query 102. Each of the search results 122a-c includes a title, a display link, and a text snippet. Each of the search results 122a-c is also linked to a respective resource, e.g., a web page, at a location indicated by the display link. User selection of a search result will cause the application to navigate to the linked resource.

The search results page 100 also includes a personal knowledge panel 130 corresponding to a logged-in user, Jim Smith. The search results page includes an indicator 110 identifying the user who is currently logged in.

The personal knowledge panel 130 includes various items of user-provided information about the user. The personal knowledge panel 130 includes the user's name 132, a profile picture 133, items of information 134, including an introduction, an occupation, and an employer, and education information. The personal knowledge panel 130 can also provide a variety of other types of user-provided information, e.g., a current status, interests, a hometown, current city, state, or country, to name just a few examples.

The personal knowledge panel 130 can also include items of information that the system extracted from other sources, e.g. resources on the Internet. For example, the system may obtain items of information that pertain to the user that are included in resources indexed by the system. For example, the occupation 139 of user "Jim Smith" may be found in resources indexed by the system. The system may determine that the resources refer to this user by matching one or more other items of information, e.g. an email address of the user that is also found on the resource. In some implementations, the system obtains user information from a publicly accessible or internally maintained knowledge graph of entities. For example, the system can determine that the user's name matches one or more aliases for an entity in a knowledge graph, and may also determine that information about the entity matches one or more other items of information about the user, e.g. an email address of the user.

The search system can provide the personal knowledge panel 130 as an interface for the user to update one or more items of user-provided information maintained by the search system. For example, upon user selection of any of the items of information 134, the search system can provide an editable text-input field for editing the item of information. For example, upon user selection of "Employer," the search system can provide editable text-field 135 through which the user can edit that particular item of information. Similarly, selecting the "Occupation," or other item of information in the personal knowledge panel 130 will allow the user to edit those fields accordingly. This can allow the user to correct and update user-provided information, in addition to any incorrect items of information that were automatically populated by the system from other sources. For example, Jim Smith's occupation were automatically populated incorrectly as a "mechanical engineer," he could use the personal knowledge panel 130 as an interface to correct system information.

The user can also directly control to whom such user-provided information will be accessible by using visibility drop-down menu 136. For example, the user can indicate, using this or any other appropriate user interface control, the groups of people that the search system will allow to access the user's information. For example, the user can select that such information provided in the personal knowledge panel 130 will be accessible by Everyone, e.g., publically available. The user can also limit access to a particular group of people, e.g., only contacts or friends of contacts. The user may also limit access to a custom defined group of people that is defined and maintained by the user, e.g., only co-workers. The visibility indicated by the user can also determine whether or not other search results provided to other users who have entered a query that matches the user's name will receive search results whose ranking is influenced by information in the personal knowledge panel 130.

In addition, the search system may allow the user to individually control the visibility of each item of information presented in the personal knowledge panel 130. For example, the user can choose to make his occupation publically available, but choose to make his education available only to contacts. The individual visibility settings can also be used for influencing the ranking of search results 122 provided to other users. For example, if the user has made his education visible only to contacts, then friends of contacts may not see search results influenced by the education information that visible to the user in his knowledge panel.

After making changes to the information in the personal knowledge panel 130, the user can save the information by either selecting a "Done" user interface control 131 or a "Save" user interface control 138. In some implementations, the system then propagates the changes in the user's information to other services provided by the search system. For example, the system can propagate the changes so that they also appear on the user's profile page of his or her social networking account. The system may also propagate changes to a city of residence to contact information in a user's email account of the search system. In this way, the user can use the knowledge panel as an efficient way to update his or her information maintained the search system from one place and in-line, e.g., without having to navigate away from the search results page 100.

In addition, the system can propagate the changes in the user's information to other services maintained by different entities, e.g. to one or more other social networking services with which the user has an account. The system can maintain one or more connected and verified accounts of the user with other services and for which the user has granted the system particular permissions for propagating such changes. When the user confirms changes through the personal knowledge panel 130, the system can communicate with the other services to propagate the changes accordingly, e.g. through an application programming interfaces maintained by the other services.

Figure 2:
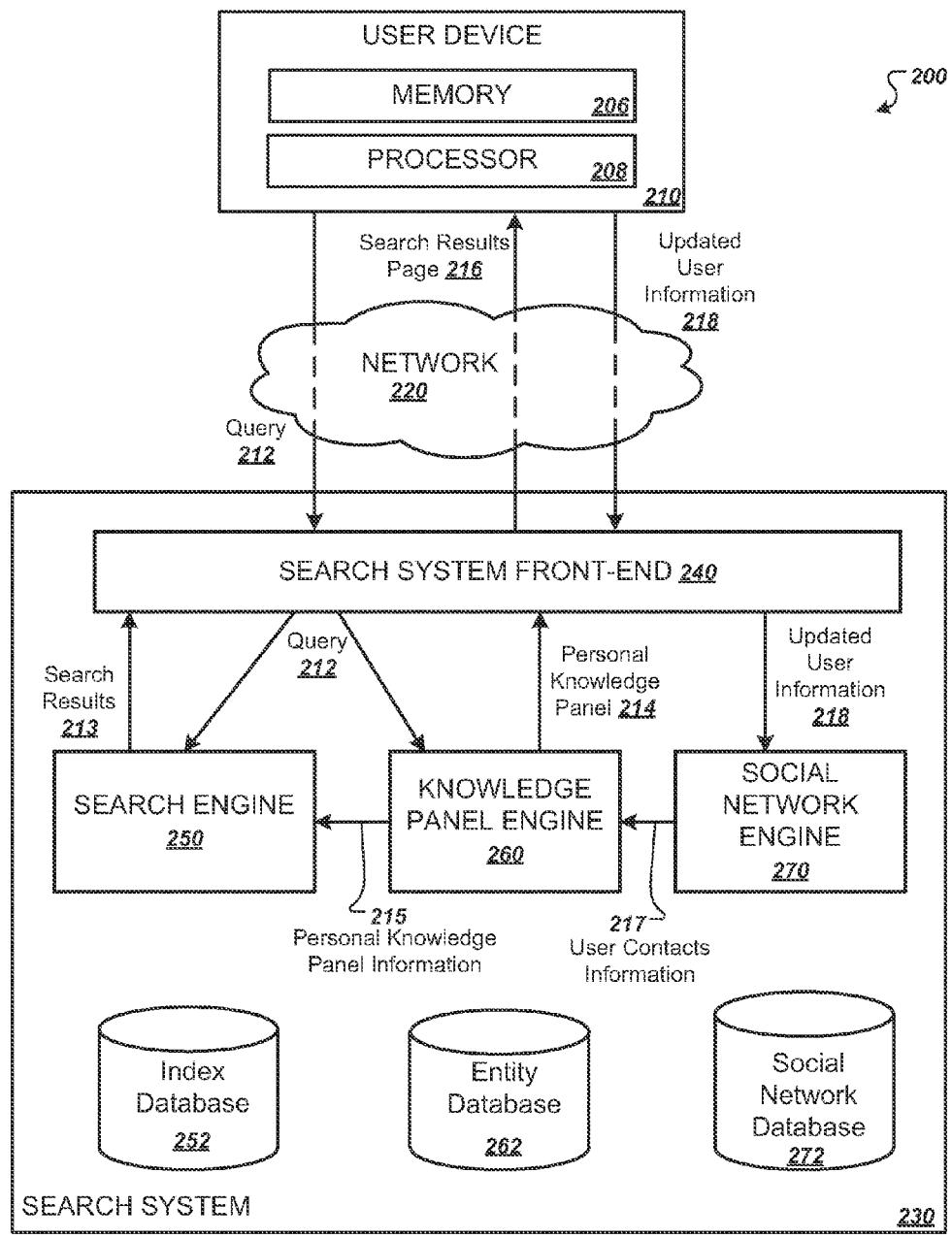
FIG. 2 is a diagram of an example system.

FIG. 2 is a diagram of an example system 200. In general, the system includes a user device 210 coupled to a search system 230 over a network 220. The search system 230 is an example of an information retrieval system in which the systems, components, and techniques described below can be implemented.

In operation, the user device 210 transmits a query 212 to the search system 230, e.g., over the network 220. The query 212 includes one or more terms and can include other information, for example, a location of the user device 210. The search system 230 generates a response, generally in the form of a search results page 216. The search results page 216 can include search results 213 that the search system 230 has identified as being responsive to the query 212. If information about a private person is responsive to the query 212 and ranks high among the search results, and if the user has a relationship that allows the user to see a personal knowledge panel for the private person, the search system 230 includes in the search results page 216 a personal knowledge panel 214 that presents information about the private person. If the private person is the user himself or herself, the search system provides the personal knowledge panel 214 as an interface for the user to update one or more items of user information maintained by the search system. The search system 230 transmits the search results page 216 over the network 220 back to the user device 210 for presentation to a user. The system then receives, through the user interface of the personal knowledge panel 214, updated user information 218, which the system can then use to update information about the user in one or more places of the search system 230.

The user device 210 can be any appropriate type of computing device, e.g., mobile phone, tablet computer, notebook computer, music player, e-book reader, laptop or desktop computer, PDA (personal digital assistant), smart phone, a server, or other stationary or portable device, that includes one or more processors 208 for executing program instructions and memory 206, e.g., random access memory (RAM). The user device 210 can include non-volatile computer readable media that store software applications, e.g., a browser or layout engine, an input device, e.g., a keyboard or mouse, a communication interface, and a display device.

The network 220 can be, for example, a wireless cellular network, a wireless local area network (WLAN) or Wi-Fi network, a Third Generation (3G), Fourth Generation (4G), or other telecommunications network, a wired Ethernet network, a private network such as an intranet, a public network such as the Internet, or any appropriate combination of such networks.

The search system 230 can be implemented as computer programs installed on one or more computers in one or more locations that are coupled to each through a network. The search system 230 includes a search system front-end 240, a search engine 250, a knowledge panel engine 260, and a social network engine 270. The computing device or devices that implement the search system front-end 240, the search engine 250, the knowledge panel engine 260, and the social network engine may include similar or different components.

In general, the search system front-end 240 receives the query 212 from the user device 210 and routes the query 212 to search engine 250 and the knowledge panel engine 260. The search system front-end 240 also provides the resulting search results page 216 that includes the search results 213 and the personal knowledge panel 214 the user device 210. In doing so, the search system front-end 240 acts as a gateway, or interface, between user devices and the search system 230.

The social network engine 270 generally maintains information regarding a social networking service. The social network engine 270 can maintain various relationships, e.g., social contact relationships, between users of the social networking service. The social network engine 270 can also receive items of digital content provided by users of the social networking service and make such digital content accessible by select other users of the social networking service. The social network engine 270 can maintain data of the social networking service in social network database 272.

The knowledge panel engine 260 receives the query 212 and determines whether to present a knowledge panel for the query. The knowledge panel can for example compare the query to information in an entity database 262 to determine whether a knowledge panel should be presented for an entity in the entity database 262. For example, the knowledge panel engine can determine whether query matches an entity alias in the entity database 262. Each entity in the entity database 262 can include data identifying one or more aliases for the entity. For example, a famous celebrity may have several nicknames or stage names for which a user may enter as a query for the celebrity, and each of these nicknames or stage names can be included as aliases for the entity in the entity index 262.

The knowledge panel engine 260 can also determine to present a personal knowledge panel by obtaining a name of a user that is currently logged into the search system and comparing the name of the user with the query 212. If the name of the user matches the query 212, the knowledge panel engine 260 can decide to present a personal knowledge panel for the user. The knowledge panel engine 260 then routes the personal knowledge panel 214 back to the search system front-end 240 for inclusion in the search results page 216.

The knowledge panel engine 260 can also receive user contacts information 217 from a social network engine 270 and determine if the query matches a name of one of the user's social networking contacts. The knowledge panel engine 260 can also receive other user contacts information 217 from other sources, e.g. chat contacts from a chat engine that provides instant messaging services or email contacts from an email engine that provides email services for the user. The user contacts information 217 can include a set of user identifiers for contacts of the user. If the query matches a name of one of the user's contacts, the knowledge panel engine 260 can generate a personal knowledge panel 214 for the user's contact and route the personal knowledge panel 214 back to the search system front-end 240 for inclusion in the search results page 216.

The search engine 250 receives the query 212 and generates search results 213 that are responsive to the query. The search engine 250 will generally include an indexing engine for indexing resources in a collection of resources. For example, the search engine 250 can index web pages found in a collection of web pages, e.g., web pages on the Internet. A collection of resources indexed by the indexing engine may, but need not, be stored within search system 230, e.g., in index database 252. The search engine 250 can rank the search results 213 using conventional methods and route the ranked search results 213 back to search system front-end 240 for inclusion in the search results page 216.

The search engine 250 may also rank search results 213 based on personal knowledge panel information 215 of the user, or a contact of the user, received from the knowledge panel engine 260, which can include user-provided information as well as automatically populated user information obtained from other sources, e.g. a publicly accessible knowledge graph. For example, a user can enable a search results personalization option for his or her account. With search results personalization enabled, the search engine 250 can use personal knowledge panel information 215 of the user or a contact of the user to influence the ranking of search results 213.

The search system 250 can use search results personalization with the personal knowledge panel, for example, to disambiguate search results that refer to people having a same name. For the query "Jim Smith," search results 213 may identify multiple resources that reference "Jim Smith." If any of the resources also reference other attributes of the personal knowledge panel information 215, the search engine can boost those search results accordingly. For example, if the personal knowledge panel information 215 includes the occupation "Accountant," the search engine 250 can boost a search result that identifies a resource that refers to Jim Smith the accountant.

If the query 212 matches the logged-in user's name, the search results page 216 will include a personal knowledge panel 214 that is editable. The user can edit his or her own information by using the personal knowledge panel 214 as an interface. Upon entering or updating his or her information through the personal knowledge panel 214, the updated user information 218 is transmitted back over the network 220 to the search system 230. The search system front-end 240 can then route the updated user information 218 to one or more modules of the search system 230, e.g., to social network engine 270, an email engine, or a chat engine.

If the user has enabled search results personalization, the updated user information 218 may propagate to the search engine 250 as updated personal knowledge panel information 215 and may influence the rank of search results 213. Thus, in some implementations, the search engine 250 can automatically rerank the search results 213 and the search system 230 can provide a corresponding updated search results page 216.

Figure 3:
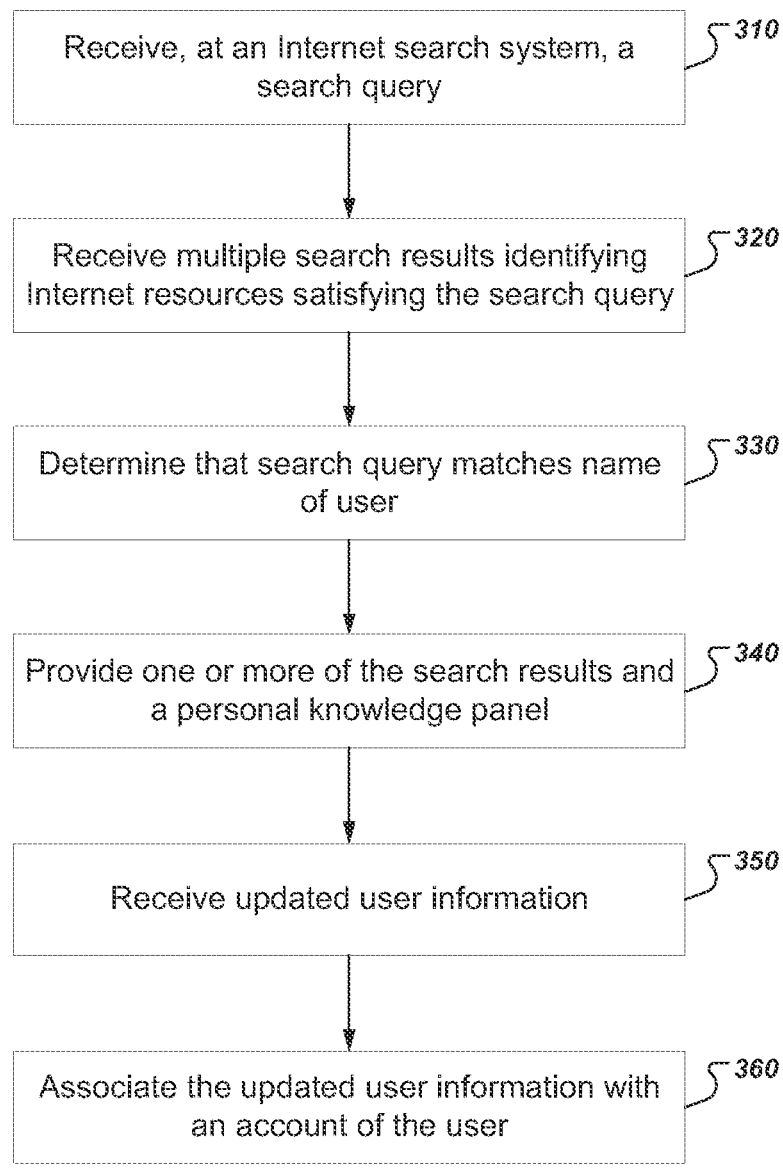
FIG. 3 is a flow chart of an example process for receiving updated user information.

FIG. 3 is a flow chart of an example process for receiving updated user information. In general, the system receives a query and presents a personal knowledge panel and search results in response to the query. A user can then provide updated user information using the personal knowledge panel. The process can be implemented by one or more computer programs installed on one or more computers. The process will be described as being performed by a system of one or more computers, e.g., the knowledge panel engine 260 of FIG. 2.

The system receives, at an Internet search system, a search query (310). The search query can be provided by a user using a default search interface of the search system used for searching resources on the Internet generally.

The system receives multiple search results identifying Internet resources satisfying the search query (320). The system can for example search a collection of indexed resources to identify search results that each identify a resource on the Internet.

The system determines that the search query matches a name of a user logged in to the system (320). The system can perform conventional spelling correction and query expansion techniques when determining whether the query matches a name of the user. For example, the system may correct "Jmi Smith" to Jim Smith. The system may also expand the query "Jim Smith" so that it also matches a user having the full name "James Smith." Furthermore, the name matched may be one of multiple names of the user.

The system provides one or more search results and a personal knowledge panel in response to the query (330). The system can present the personal knowledge panel with the search results. The personal knowledge panel will generally include a presentation of one or more items of user-provided information about the user or a contact of the user.

If the personal knowledge panel is provided for the user who is logged in, each of the items of user-provided information in the personal knowledge panel can be edited by the user and without requiring the user to leave the search results page. For example, upon selection of an item of information by the user, the presentation can transition to an input field where the user can edit or replace the corresponding item of information. For example, the user can select a presented item corresponding to his or her occupation, causing the item to change to editable input field. The user can then enter an updated occupation. Personal knowledge panels that are provided for contacts of the user will generally not be editable by the user.

The system will obtain and provide one or more search results that satisfy the query. The ranking of the one or more search results may be influenced by information in the personal knowledge panel. For example, the system can use information in the personal knowledge panel to generate a revised query, for example, by adding to the original query one or more additional terms obtained from items of user-provided or automatically populated user information presented in the personal knowledge panel. The system can also use information in the personal knowledge to cluster or filter search results.

The system receives updated user information (340). When the user has confirmed changes to his or her user information in the personal knowledge panel, e.g., by selecting a "Done editing," user interface control, the user application presenting the knowledge panel can transmit to the system the values of the updated user information. For example, a web browser running on a user device can execute a client-side script that transmits the updated user information back to the system upon the information being confirmed by the user.

Generally, the submission of the updated user information will not require or cause the user application to navigate to another web page. Rather, the updated user information can be transmitted transparently, from the user's perspective, and the user application can remain on the same search results page while the user's information is updated.

The system associates the updated user information with an account of the user (350). For example, the system can update information associated with the user in one or more services of the system, e.g., the user's email or social networking account.

If a user has enabled search results personalization, the updated information in the personal knowledge panel may affect the ranking of the provided search results. In some implementations, upon receiving the updated user information, the system may automatically provide a new ranking of search results that is based on updated information in the personal knowledge panel For example, referring back to FIG. 1, if a user changes the occupation field 139 from "Civil Engineer" to "Accountant," the system can provide a new ranking of search results based on this information. The change from "Civil Engineer" to "Accountant" may alter the ranking of search results 122a-c. For example, the search result 122c for Jim Smith the accountant my swap places with the search result 122b for Jim Smith the civil engineer.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer implemented method comprising:
receiving, at an Internet search system, a search query;
receiving multiple search results, each of the search results identifying an Internet resource indexed by the search system that satisfies the query;
determining that the search query matches a name of a user that submitted the search query;
providing, in response to the search query, a ranking of one or more of the search results and a personal knowledge panel comprising one or more items of user-provided information about the user, wherein the personal knowledge panel includes multiple input fields for updating the user-provided information of the knowledge panel;
receiving updated user information that was provided using the input fields of the personal knowledge panel; and
associating the updated user information with an account of the user.

2. The method of claim 1, wherein the personal knowledge panel allows the user to modify the one or more items of user-provided information without the navigating away from a search results page that includes a presentation of the one or more search results.

3. The method of claim 1, wherein the ranking of the one or more search results is based on information provided in the personal knowledge panel.

4. The method of claim 1, further comprising:
reranking the search results based on the updated user information; and
providing a different ranking of one or more search results based on the updated user information.

5. The method of claim 1, further comprising providing a different ranking of one or more search results based on the updated user information without further input from the user.

6. The method of claim 1, further comprising:
receiving, at the Internet search system, a second occurrence of the search query from a second user;
receiving multiple second search results, each of the second search results identifying an Internet resource indexed by the search system that satisfies the query;
determining that the search query matches a name of the user and that the user is a contact of the second user; and
providing to the second user, in response to the search query, a second ranking of the one or more second search results and a second personal knowledge panel comprising one or more items of the updated user information provided by the user.

7. The method of claim 6, wherein the second ranking of the one or more second search results is based on the updated user information provided in the second personal knowledge panel.

8. The method of claim 6, wherein visibility of one or more items of user information in the second personal knowledge panel is based on visibility settings provided by the user.

9. The method of claim 1, wherein receiving updated user information that was provided using the input fields of the personal knowledge panel comprises receiving an indication of visibility that is specific to an item of the updated user information.

10. The method of claim 1, further comprising providing the received updated user information to one or more other services that each are linked with the account of the user.

11. A system comprising:
one or more computers and one or more storage devices storing instructions that are operable, when executed by the one or more computers, to cause the one or more computers to perform operations comprising:
receiving, at an Internet search system, a search query;
receiving multiple search results, each of the search results identifying an Internet resource indexed by the search system that satisfies the query;
determining that the search query matches a name of a user that submitted the search query;
providing, in response to the search query, a ranking of one or more of the search results and a personal knowledge panel comprising one or more items of user-provided information about the user, wherein the personal knowledge panel includes multiple input fields for updating the user-provided information of the knowledge panel;

receiving updated user information that was provided using the input fields of the personal knowledge panel; and associating the updated user information with an account of the user.

12. The system of claim 11, wherein the personal knowledge panel allows the user to modify the one or more items of user-provided information without the navigating away from a search results page that includes a presentation of the one or more search results.

13. The system of claim 11, wherein the ranking of the one or more search results is based on information provided in the personal knowledge panel.

14. The system of claim 11, wherein the operations further comprise:

reranking the search results based on the updated user information; and providing a different ranking of one or more search results based on the updated user information.

15. The system of claim 11, wherein the operations further comprise providing a different ranking of one or more search results based on the updated user information without further input from the user.

16. The system of claim 11, wherein the operations further comprise:

receiving, at the Internet search system, a second occurrence of the search query from a second user;

receiving multiple second search results, each of the second search results identifying an Internet resource indexed by the search system that satisfies the query;

determining that the search query matches a name of the user and that the user is a contact of the second user; and providing to the second user, in response to the search query, a second ranking of the one or more second search results and a second personal knowledge panel comprising one or more items of the updated user information provided by the user.

17. The system of claim 16, wherein the second ranking of the one or more second search results is based on the updated user information provided in the second personal knowledge panel.

18. The system of claim 16, wherein visibility of one or more items of user information in the second personal knowledge panel is based on visibility settings provided by the user.

19. The system of claim 11, wherein receiving updated user information that was provided using the input fields of the personal knowledge panel comprises receiving an indication of visibility that is specific to an item of the updated user information.

20. The system of claim 11, wherein the operations further comprise providing the received updated user information to one or more other services that each are linked with the account of the user.

* * * * *